US009215315B2

(12) United States Patent
Faaborg

(10) Patent No.: US 9,215,315 B2
(45) Date of Patent: Dec. 15, 2015

(54) SYSTEMS AND METHODS FOR CONTEXTUAL CALLER IDENTIFICATION

(71) Applicant: Google Inc., Mountain View, CA (US)

(72) Inventor: Alexander Faaborg, Mountain View, CA (US)

(73) Assignee: Google Inc., Mountain View, CA (US)

( * ) Notice: Subject to any disclaimer, the term of this patent is extended or adjusted under 35 U.S.C. 154(b) by 10 days.

(21) Appl. No.: 14/149,311

(22) Filed: Jan. 7, 2014

(65) Prior Publication Data

US 2015/0195400 A1    Jul. 9, 2015

(51) Int. Cl.
*H04M 3/42* (2006.01)
*H04M 1/57* (2006.01)
*H04M 7/00* (2006.01)

(52) U.S. Cl.
CPC .......... *H04M 3/42042* (2013.01); *H04M 1/575* (2013.01); *H04M 7/0036* (2013.01); *H04M 3/42348* (2013.01); *H04M 2203/354* (2013.01); *H04M 2203/551* (2013.01); *H04M 2207/203* (2013.01)

(58) Field of Classification Search
CPC . H04W 36/00; H04M 3/42042; H04M 1/575; H04M 3/42348; H04M 2207/203; H04M 2203/354; H04M 2203/551; H04M 7/0036
USPC .......................... 455/415, 456.1; 379/142.04
See application file for complete search history.

(56) References Cited

U.S. PATENT DOCUMENTS

| 7,567,846 | B2 * | 7/2009 | Sztybel ............................ 700/94 |
| 7,840,226 | B1 * | 11/2010 | Walsh et al. ............... 455/456.1 |
| 8,213,587 | B2 | 7/2012 | Vendrow |
| 8,285,266 | B2 | 10/2012 | Cui |
| 2001/0012347 | A1 * | 8/2001 | Fujino et al. .............. 379/142.06 |
| 2002/0191775 | A1 | 12/2002 | Boies et al. |
| 2005/0107074 | A1 * | 5/2005 | Zellner .......................... 455/415 |
| 2007/0105537 | A1 * | 5/2007 | Mahajan et al. ............... 455/415 |
| 2007/0142078 | A1 | 6/2007 | Chen et al. |
| 2007/0185844 | A1 | 8/2007 | Schachter |
| 2007/0293206 | A1 * | 12/2007 | Lund .............................. 455/415 |
| 2010/0208876 | A1 * | 8/2010 | Tsuei ....................... 379/142.04 |
| 2011/0130130 | A1 | 6/2011 | Du |
| 2012/0196582 | A1 * | 8/2012 | Ahn et al. ..................... 455/415 |
| 2013/0329876 | A1 | 12/2013 | Kho et al. |

FOREIGN PATENT DOCUMENTS

| EP | 1461935 B1 | 9/2004 |
| EP | 2073517 A1 | 6/2009 |

OTHER PUBLICATIONS

Ono, Kumiko, et al., "Using cross-media relations to identify important communication requests: testing the concept and implementation," Proceedings of IPTCOMM 2011: Principles, Systems and Applications of IP Telecommunications (2011).
PCT/US2015/010501 International Search Report and Written Opinion, Mailed May 4, 2015.

\* cited by examiner

*Primary Examiner* — Charles Shedrick
(74) *Attorney, Agent, or Firm* — Troutman Sanders LLP; James E. Schutz; Christopher W. Glass

(57) ABSTRACT

In an example implementation of the disclosed technology, a method includes, responsive to receiving, at a computing device, an indication of an incoming request for live communication from a caller having corresponding identifying information, locating, by the computing device, at least one occurrence of the identifying information in history data. The history data is associated with past activity of a user of the computing device in relation to the caller. The method also includes outputting, by the computing device, for display, image content based on the history data. The image content includes an image of web-based content associated with the identifying information.

24 Claims, 10 Drawing Sheets

SYSTEMS AND METHODS FOR CONTEXTUAL CALLER IDENTIFICATION

BACKGROUND

Users of mobile computing devices are often hesitant to answer incoming requests for live communication (e.g., for telephone calls) associated with identifying information (e.g., telephone numbers) that they do not recognize. In some instances, a user may provide input (e.g., names and telephone numbers) to a mobile computing device to define a contact list, such that identification information may be displayed by the mobile computing device upon receipt of an incoming request for live communication. However, unless the identifying information of an incoming caller is stored in the contact list, conventional mobile computing devices may be unable to differentiate requestors known to the user from those with no relation to the user.

SUMMARY

Some or all of the above needs may be addressed by certain implementations of the disclosed technology. Certain implementations may include methods, systems, and non-transitory computer-readable medium for identifying a caller based on contextual information associated with past activity of a computing device user.

According to an example implementation, a method is provided. The method includes, responsive to receiving, at a computing device, an indication of a request for live communication from a caller with corresponding identifying information, locating, by the computing device, at least one occurrence of the identifying information in history data. The history data is associated with past activity of a user of the computing device in relation to the caller. The method also includes outputting, by the computing device, for display, image content based on the history data. The image content includes an image of web-based content associated with the identifying information.

According to another example implementation, a system is provided. The system includes one or more processors and a memory coupled to the one or more processors. The memory stores instructions that, when executed by the one or more processors, cause the system to perform specific functions. The functions include, responsive to receiving an indication of an incoming request for live communication from a caller with corresponding identifying information, locating at least one occurrence of the identifying information in history data. The history data is associated with past activity of a user of the computing device in relation to the caller. The functions also include outputting, for display, image content based on the history data. The image content includes an image of web-based content associated with the identifying information.

According to another example implementation, a non-transitory computer-readable medium is provided. The computer-readable medium stores instructions that, when executed by one or more processors, cause a computing device to perform specific functions that include, responsive to receiving an indication of an incoming request for live communication from a caller with corresponding identifying information, locating at least one occurrence of the identifying information in history data. The history data is associated with past activity of a user of the computing device in relation to the caller. The functions also include includes outputting, for display, image content based on the history data. The image content includes an image of web-based content associated with the identifying information.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
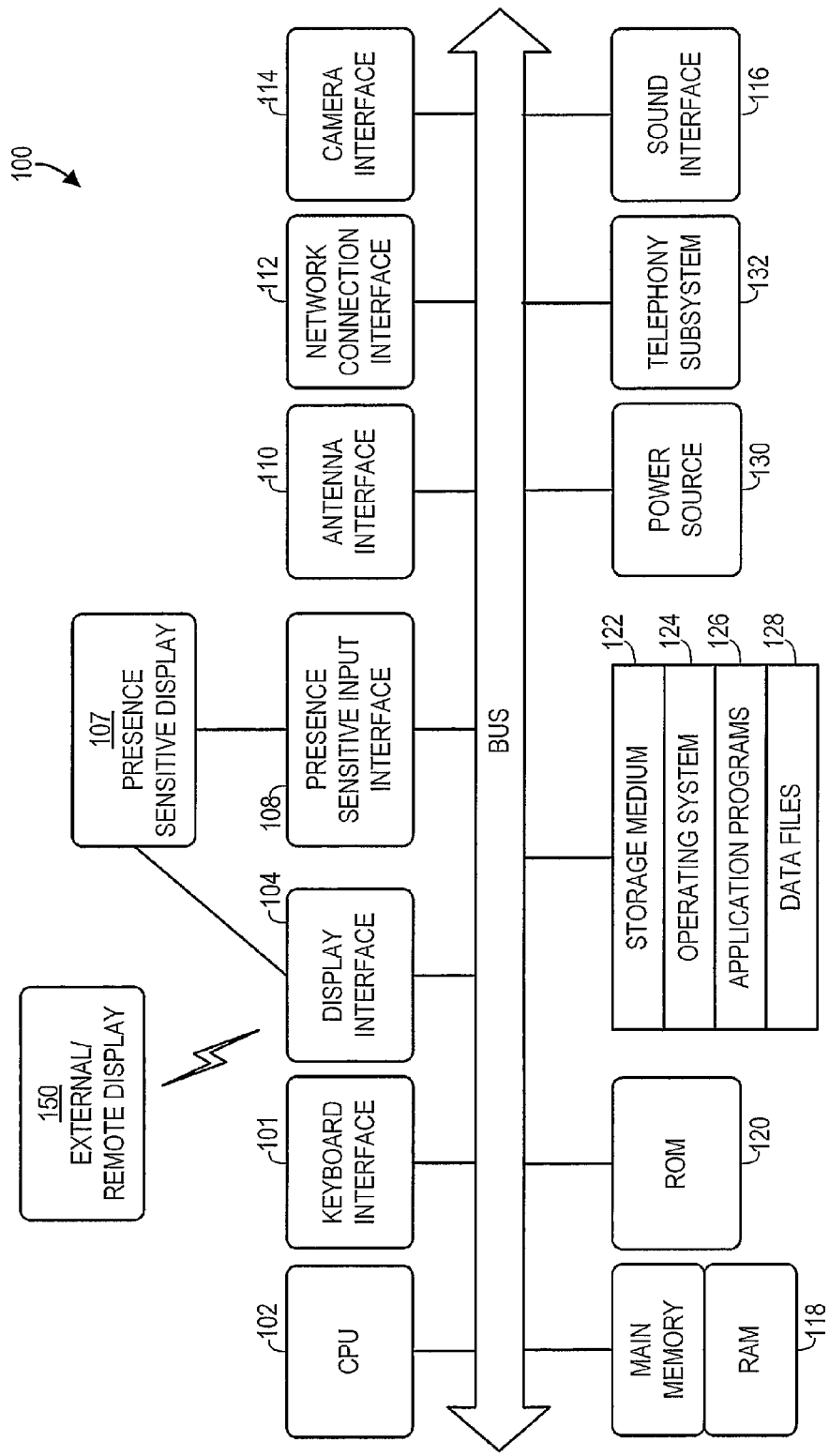
FIG. 1 is a block diagram of an illustrative computer system architecture 100, according to an example implementation.

In certain implementations of the disclosed technology, a computing device receives a request for live communication (e.g. phone call, video conference, message exchange) from a caller with corresponding identifying information and, in response, locates one or more occurrences of the identifying information in history data that is associated with past activity of a user of the computing device in relation to the caller. Based on the history data, the computing device can output, for display, image content that includes contextual, web-based content associated with the identifying information (e.g, telephone number) in a form that reflects a particular instance and way in which the user encountered the caller through past activities. As used herein, "caller" may refer to a party originating a telephone call using a telephone number that a recipient computing device does not recognize as corresponding to a party known by the user of the computing device, for example a preferred business, organization, or a friend. Past activity by the user may include one or more of interacting with a web page, exchanging an electronic message, physically visiting a certain geographical location, and/or performing a web search related to the caller. The computing device may locate multiple records of past activities from across a variety of web-based sources, to form an aggregated visual representation image content to illustrate a particular instance and way in which the user previously encountered the caller.

Past activity of the user, for purposes of history data for locating the identifying information, is not limited to activities the user performed using the specific computing device that receives the incoming request for live communication.

The computing device may additionally or alternatively locate the identifying information in history data obtained from various web-based sources storing data associated with activities the user conducted using various other devices and/or applications. A person or ordinary skill will recognize that currently available resources allow an individual to coordinate his/her multiple devices through a common user account or profile. Accordingly, a user of a computing device according to example implementations of the disclosed technology may be a user of connected services that allow him/her to coordinate web-based activities across multiple devices and/or applications. For example, the user may use a single account or user profile to synchronize user data and usage histories across his/her email applications, search engine applications, web browsing applications, and map applications. The connected services may collect data reflecting the history of the activities performed by the user such that history data that includes the identifying information number corresponding to the caller is accessible by the computing device from among various sources.

In an example implementation, the computing device may locate the identifying information in stored data including history of web searches performed by the user. For example, the user may have performed a search for web pages, articles, or maps associated with the caller by entering particular search terms or a physical address in a web-based search engine. Once the phone number is located, the computing device may output, for display, image content showing search results as they were originally presented to the user. The image content that is output for display may show the particular identifying information as it was presented to the user within the search results.

In an example implementation, the computing device may locate the identifying information associated with the caller by referencing a database of locations the user physically visited in the past. If the user visited a geographic location associated with the identifying information, the computing device may output, for display, a visual map representation of the location upon receiving the incoming request for live communication. The computing device may additionally or alternatively provide a photo image showing an aerial view, street view, or inside view of the location. The past locations visited may be determined, for example, from geolocation data obtained by GPS components of the computing device, which may have been recorded when the user physically visited the location while carrying the computing device. The geolocation data may additionally or alternatively have been obtained through network-based location techniques such as IP-address tracking or wireless signal triangulation and proximity detection using wireless networks such as cellular or Wi-Fi networks.

In an example implementation, if the user accessed or otherwise interacted with a web page associated with the caller, the computing device may output, for display, a view of the web page as it was displayed to the user when web browsing. The view may show the identifying information as it was displayed on the web page. The computing device may locate the identifying information from within web browsing history data, which may include html code, downloaded image files, or metadata associated with the web page that may be stored in local memory of the computing device or remote storage. Once the identifying information is located, the computing device may provide the visual representation based on the corresponding data.

In an example implementation, the computing device may locate the identifying information of the caller in history data associated with electronic messages such as email messages or social network messages exchanged between the user of the computing device and the caller. The computing device may output, for display, a view of the message as the user entered or read it, for example as it was displayed in an email client application or social network application. The view may show the identifying information as it was originally presented to the user. The computing device may locate the identifying information from within local or external storage, for example network-based email servers and databases that may include specifically formatted document files or raw text data.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Example implementations of the disclosed technology will now be described with reference to the accompanying figures.

According to certain example implementations described herein, the terms computing device or mobile computing device, as used herein, may be a central processing unit (CPU), controller or processor, or may be conceptualized as a CPU, controller or processor (for example, the processor 101 of FIG. 1). In yet other instances, a computing device may be a CPU, controller or processor combined with one or more additional hardware components. In certain example implementations, the computing device operating as a CPU, controller or processor may be operatively coupled with one or more peripheral devices, such as a display, navigation system, stereo, entertainment center, Wi-Fi access point, or the like. In another example implementation, the term computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In an example embodiment, the computing device may output content to its local display or speaker(s). In another example implementation, the computing device may output content to an external display device (e.g., over Wi-Fi) such as a TV or an external computing system.

FIG. 1 is a block diagram illustrating one embodiment of a computing device 100 in accordance with various aspects set forth herein. In FIG. 1, the computing device 100 may be configured to include a processor 101, which may also be referred to as a computing device, that is operatively coupled to a display interface 103, an input/output interface 105, a presence-sensitive display interface 107, a radio frequency (RF) interface 109, a network connection interface 111, a camera interface 113, a sound interface 115, a random access memory (RAM) 117, a read only memory (ROM) 119, a storage medium 121, an operating system 123, an application program 125, data 127, a communication subsystem 131, a power source 133, another element, or any combination thereof. In FIG. 1, the processor 101 may be configured to process computer instructions and data. The processor 101 may be configured to be a computer processor or a controller. For example, the processor 101 may include two computer processors. In one definition, data is information in a form suitable for use by a computer. A person of ordinary skill will recognize that the subject matter of this disclosure may be implemented using various operating systems or combinations of operating systems.

In FIG. 1, the display interface 103 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia interface (HDMI) port, a video port, an audio port, a Bluetooth port, a near-field communication (NFC) port, another like communication interface, or any combination thereof. In one example, the display interface 103 may be operatively coupled to a local display, such as a touch-screen display associated with a mobile device. In another example, the display interface 103 may be configured to provide video, graphics, images, text, other information, or any combination thereof for an external/remote display 141 that is not necessarily connected to the mobile computing device. In one example, a desktop monitor may be utilized for mirroring or extending graphical information that may be presented on a mobile device. In another example, the display interface 103 may wirelessly communicate, for example, via the network connection interface 111 such as a Wi-Fi transceiver to the external/remote display 141.

In the current embodiment, the input/output interface 105 may be configured to provide a communication interface to an input device, output device, or input and output device. The computing device 100 may be configured to use an output device via the input/output interface 105. A person of ordinary skill will recognize that an output device may use the same type of interface port as an input device. For example, a USB port may be used to provide input to and output from the computing device 100. The output device may be a speaker, a sound card, a video card, a display, a monitor, a printer, an actuator, an emitter, a smartcard, another output device, or any combination thereof. The computing device 100 may be configured to use an input device via the input/output interface 105 to allow a user to capture information into the computing device 100. The input device may include a mouse, a trackball, a directional pad, a trackpad, a presence-sensitive input device, a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with a display to form a presence-sensitive display. Further, the presence-sensitive input device may be coupled to the computing device. The sensor may be, for instance, an accelerometer, a gyroscope, a tilt sensor, a force sensor, a magnetometer, an optical sensor, a proximity sensor, another like sensor, or any combination thereof. For example, the input device 115 may be an accelerometer, a magnetometer, a digital camera, a microphone, and an optical sensor.

In FIG. 1, the presence-sensitive display interface 107 may be configured to provide a communication interface to a display 108 or a presence sensitive input 110. In one definition, a presence-sensitive display is an electronic visual display that may detect the presence and location of a touch, gesture, or object near its display area. In one definition, a presence-sensitive input may be a device that accepts input by the proximity of a finger, a stylus, or an object near the device, such as a touch screen. In one definition, the term "near" means on, proximate or associated with. In another definition, the term "near" is the extended spatial location of. The RF interface 109 may be configured to provide a communication interface to RF components such as a transmitter, a receiver, and an antenna. The network connection interface 111 may be configured to provide a communication interface to a network 143a. The network 143a may encompass wired and wireless communication networks such as a local-area network (LAN), a wide-area network (WAN), a computer network, a wireless network, a telecommunications network, another like network or any combination thereof. For example, the network 143a may be a cellular network, a Wi-Fi network, and a near-field network. As previously discussed, the display interface 103 may be in communication with the network connection interface 111, for example, to provide information for display on a remote display that is operatively coupled to the computing device 100. The camera interface 113 may be configured to provide a communication interface and functions for capturing digital images or video from a camera. The sound interface 115 may be configured to provide a communication interface to a microphone or speaker.

In this embodiment, the RAM 117 may be configured to interface via the bus 102 to the processor 101 to provide storage or caching of data or computer instructions during the execution of software programs such as the operating system, application programs, and device drivers. In one example, the computing device 100 may include at least one hundred and twenty-eight megabytes (128 Mbytes) of RAM. The ROM 119 may be configured to provide computer instructions or data to the processor 101. For example, the ROM 119 may be configured to be invariant low-level system code or data for basic system functions such as basic input and output (I/O), startup, or reception of keystrokes from a keyboard that are stored in a non-volatile memory. The storage medium 121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 121 may be configured to include an operating system 123, an application program 125 such as a web browser application, a widget or gadget engine or another application, and a data file 127.

In FIG. 1, the computing device 101 may be configured to communicate with a network 143b using the communication subsystem 131. The network 143a and the network 143b may be the same network or networks or different network or networks. The communication functions of the communication subsystem 131 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 131 may include cellular communication, Wi-Fi communication, Bluetooth communication, and GPS communication. The network 143b may encompass wired and wireless communication networks such as a local-area network (LAN), a wide-area network (WAN), a computer network, a wireless network, a telecommunications network, another like network or any combination thereof. For example, the network 143b may be a cellular network, a Wi-Fi network, and a near-field network. The power source 133 may be configured to provide an alternating current (AC) or direct current (DC) power to components of the computing device 100.

In FIG. 1, the storage medium 121 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 121 may allow the computing device 100 to access computer-executable instructions, application programs or the like, stored on transitory or non-transitory memory media, to off-load data, or to upload data. An article of manufacture, such as one utilizing a communication system may be tangibly embodied in storage medium 122, which may comprise a non-transitory computer-readable medium.

Figure 2A:
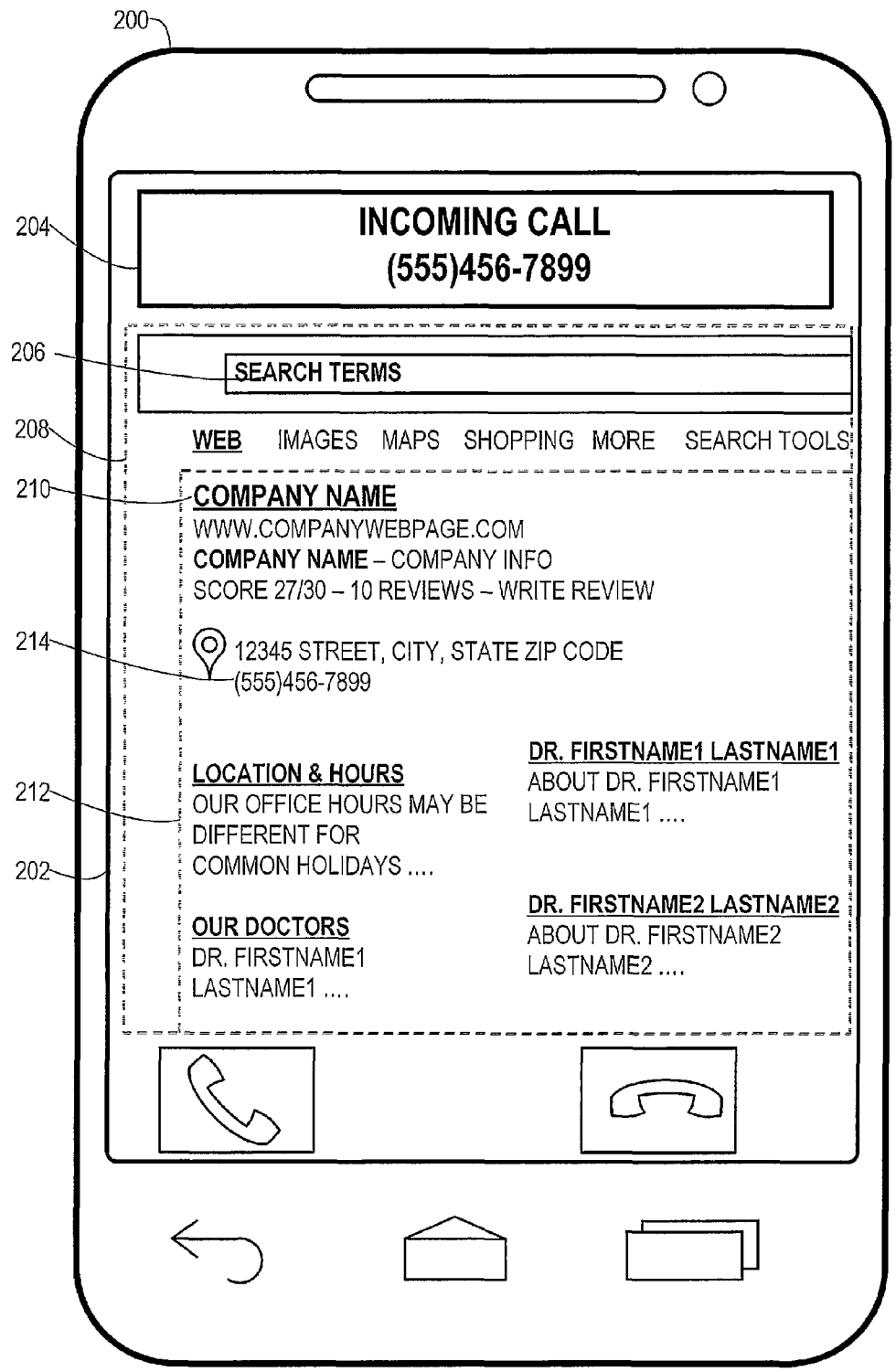
FIG. 2A illustrates a computing device 200 according to an example implementation.
Figure 2B:
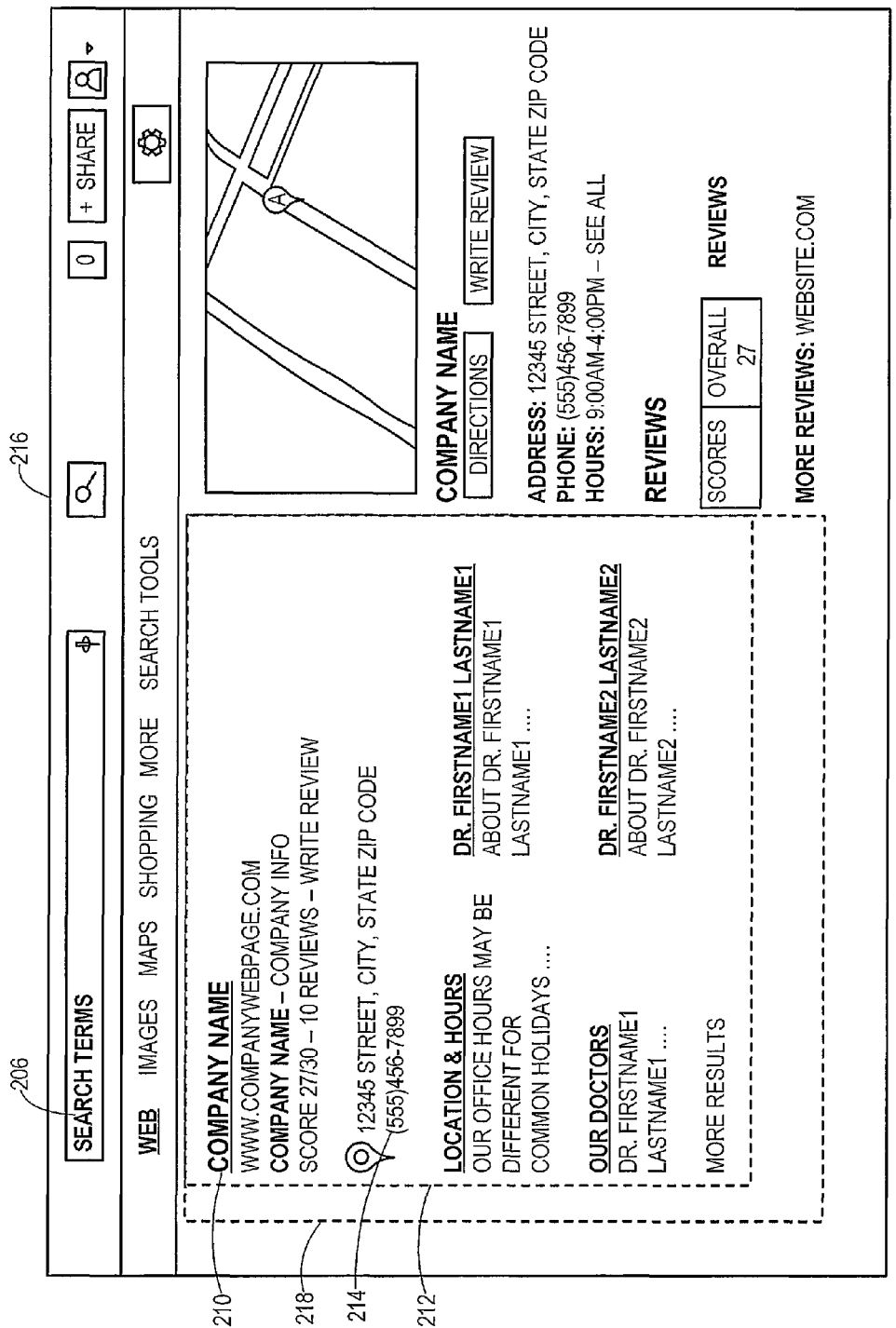
FIG. 2B illustrates past activities by a user of the computing device 200.

FIG. 2A illustrates a mobile computing device 200 according to an example implementation of the disclosed technology, which may include some or all of the components of the computing device 100 shown in FIG. 1. The computing device 200 is configured to output, for display on a display screen 202, a phone number 204 (i.e. identifying information) of an incoming call (i.e. a request for live communication) and image content 208 illustrating search terms 206 ("mountain view optometry") and corresponding search results 212 from a past web search. The computing device 200 has located the phone number 204 in stored data that includes a history of web searches performed by the user that receives the incoming call on the computing device 200. The view of the search results 212 displayed on the display screen 202 shown in FIG. 2A is a partial view of larger screen view 218 of search results as illustrated in FIG. 2B, as it was presented on a display of a device used to perform the search.

As shown, the larger view of the search results 218 (FIG. 2B) shows several listings of relevant hits for the search terms 206 entered. One of the returned results 210 lists a business along with its phone number 214, which is the same phone number 204 that corresponds to the incoming call. Thus, in the example implementation of FIG. 2A, it is intended that the user of the computing device 200 will recognize the caller based on the partial view 212 of the search results 218. Data for identifying the caller is therefore presented to the user in a form that is contextually relevant to a way in which the user encountered the caller associated with the phone number in the past, i.e. by performing a web search for the name of the business using a search engine. The search may have been performed on the computing device 200, for example using a search engine application executing on the computing device 200.

Figure 3A:
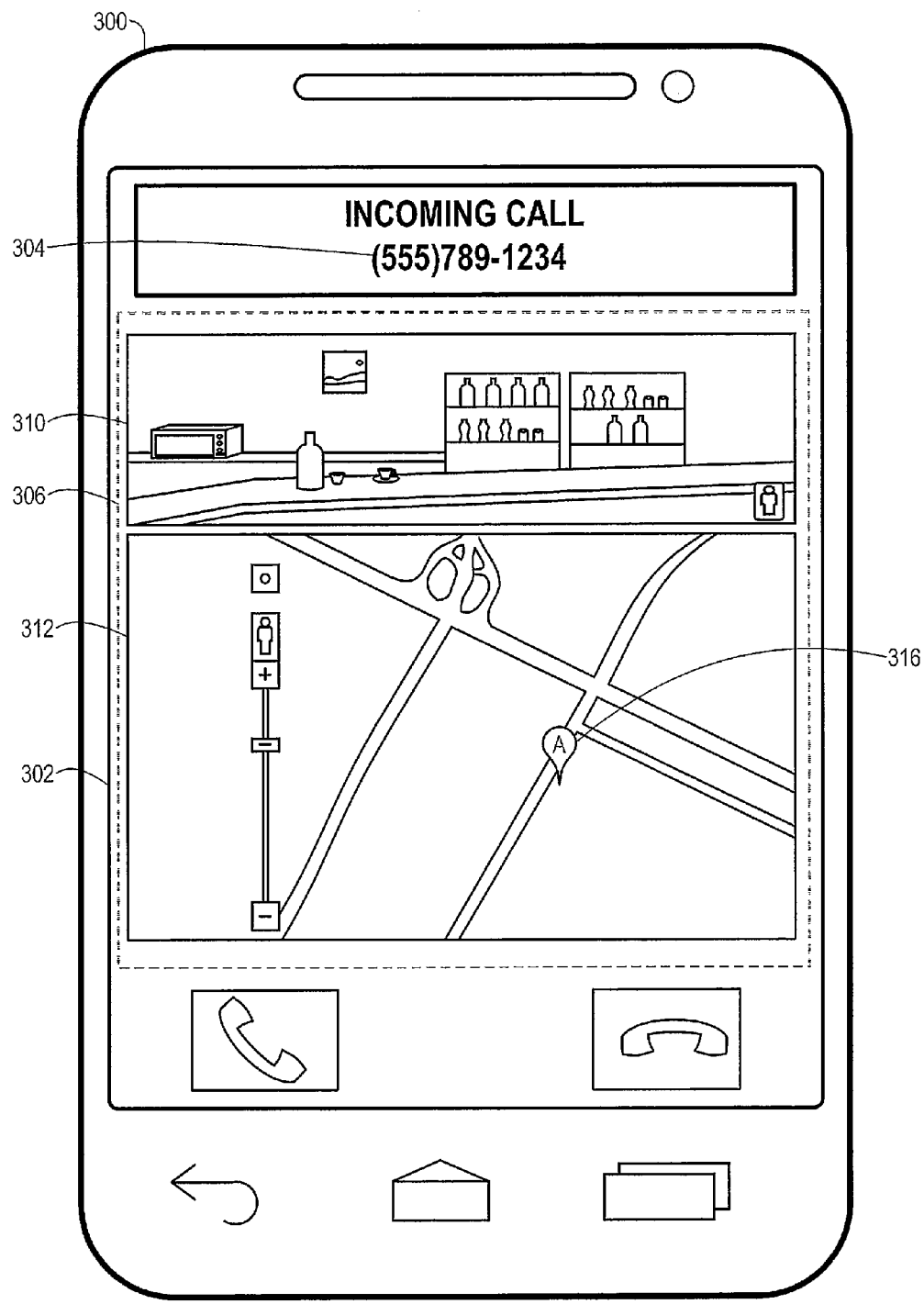
FIG. 3A illustrates a computing device 300 according to an example implementation.

FIG. 3A illustrates a mobile computing device 300 according to an example implementation of the disclosed technology, which may include some or all of the components of the computing device 100 shown in FIG. 1. The computing device 300 is configured to output, for display on a display screen 302, a phone number 304 corresponding to an incoming call, and image content 306 that includes a photo image 308 of an inside view of a business associated with the phone number 304. The computing device 300 has located the phone number 304 in stored data that includes a history of web-based searches performed by the person receiving the incoming call on the computing device 300 (i.e. the user of the computing device 300), for locating a business according to a particular street address ("201 Castro Street, Mountain View, Calif."). The results of this past search are shown in FIG. 3B as including, among other information, the phone number 304, street address, website URL ("redrockcofee.org"), a customer rating, and the photo image 308.

Figure 3B:
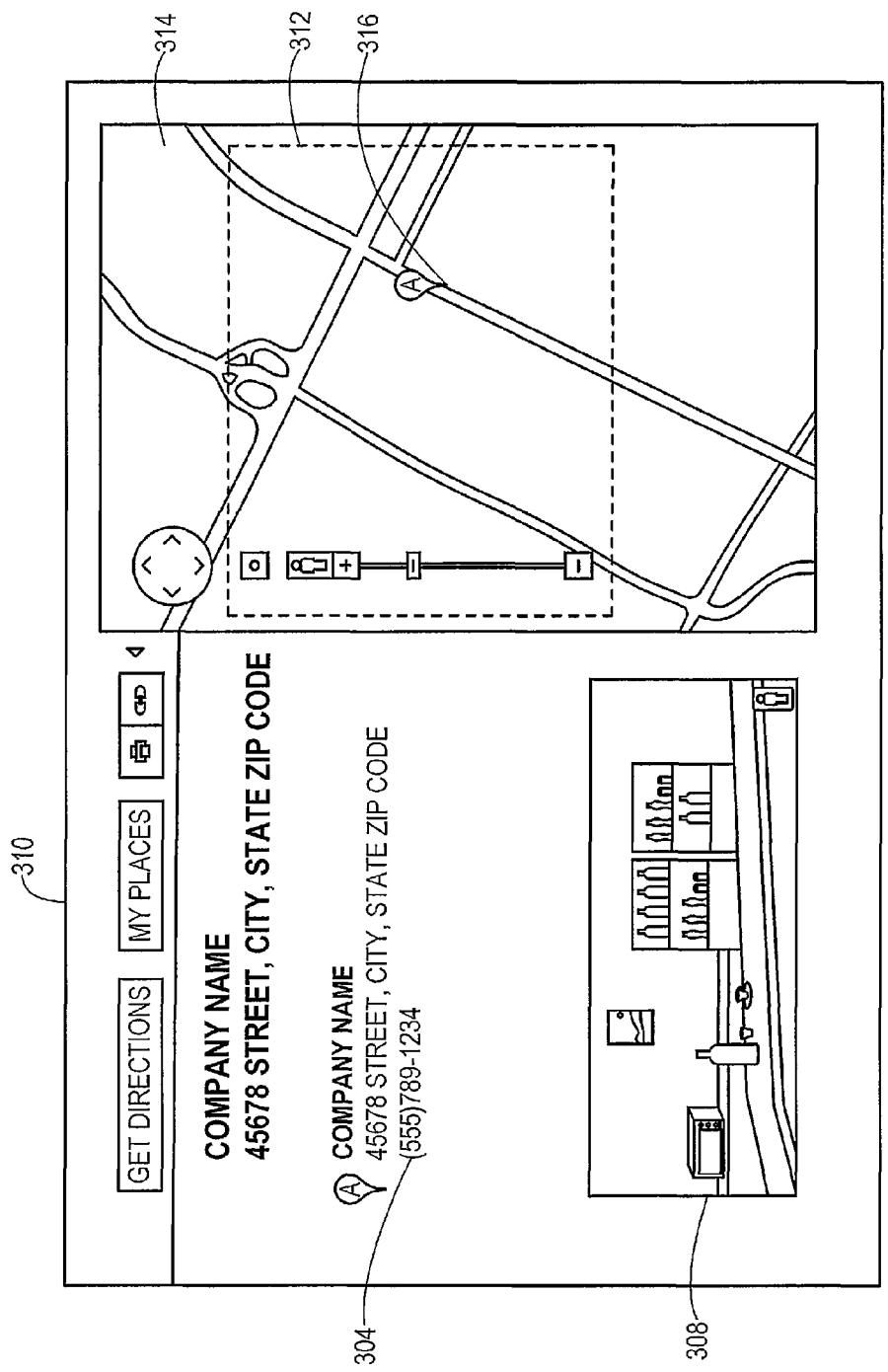
FIG. 3B illustrates past activities by a user of the computing device 300.

The image content 306 displayed on the display screen 302 shows portions of image content shown in the larger screen view 310 illustrated in FIG. 3B. The larger screen view 310 shows image content as it was displayed on a device used to perform the web-based search, which may be the computing device 300. In particular, the image content 306 displayed on the display screen 302 of the computing device 300 contains the photo image 308 as displayed in the larger screen view 310, as well as a partial view 312 of a visual map representation 314 in FIG. 3B that illustrates the geographic location of the business (shown by reference numeral 316 and marker "A" in both FIGS. 3A and 3B). The phone number 304 may further be, or alternatively be, located by the computing device 300 from within geolocation data for locations the user physically visited while carrying the computing device 300, for example by cross-referencing the geolocation coordinates with databases containing phone numbers associated with specific street addresses and/or coordinates. The geolocation data may have been obtained using GPS functionality of the computing device 300.

The image content 306 displayed on the display screen 302 of the computing device 300 does not include an image of the results of the location search performed by the user. Thus, in the example implantation of FIG. 3A, it is intended that a user of the computing device 300 will recognize the caller based on the partial view 312 of the visual map representation 314 and the internal photo image 308. Data for identifying the caller is therefore presented to the user of the computing device 300 in a form that is contextually relevant to a way in which the user encountered the caller associated with the phone number in the past, i.e. by performing a web search for the business and/or physically visiting the geographic location of the business.

Figure 4A:
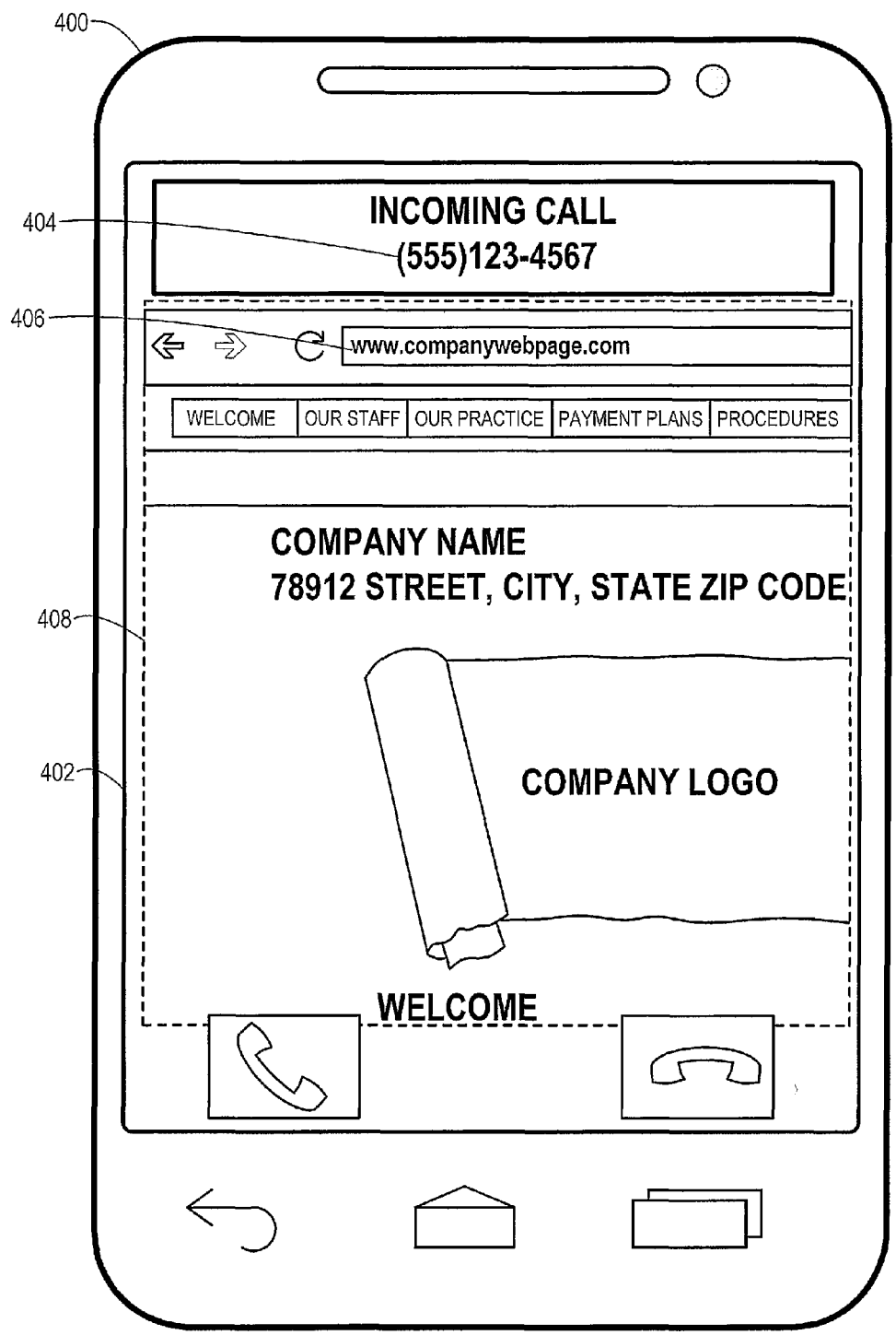
FIG. 4A illustrates a computing device 400 according to an example implementation.

FIG. 4A illustrates a mobile computing device 400 according to an example implementation of the disclosed technology, which may include some or all of the components of the computing device 100 shown in FIG. 1. The computing device 400 is configured to output, for display on a display screen 402, a phone number 404 corresponding to an incoming call and image content 408 illustrating a partial view of a web page 412 (FIG. 4B) associated with the caller having the phone number 404. The image content 408 displayed on the display screen 402 corresponds to a portion of a larger screen view 410 of the web page 412 in the form it was displayed to a user of a device used to interact with the web page 412 in the past, which may be the computing device 400. The image content 408 includes a partial view of the name of the caller, which is associated with a business as shown within the web page 412, as well as the top section of the web page 412 showing the URL 406 and some of the interactive menu items.

Figure 4B:
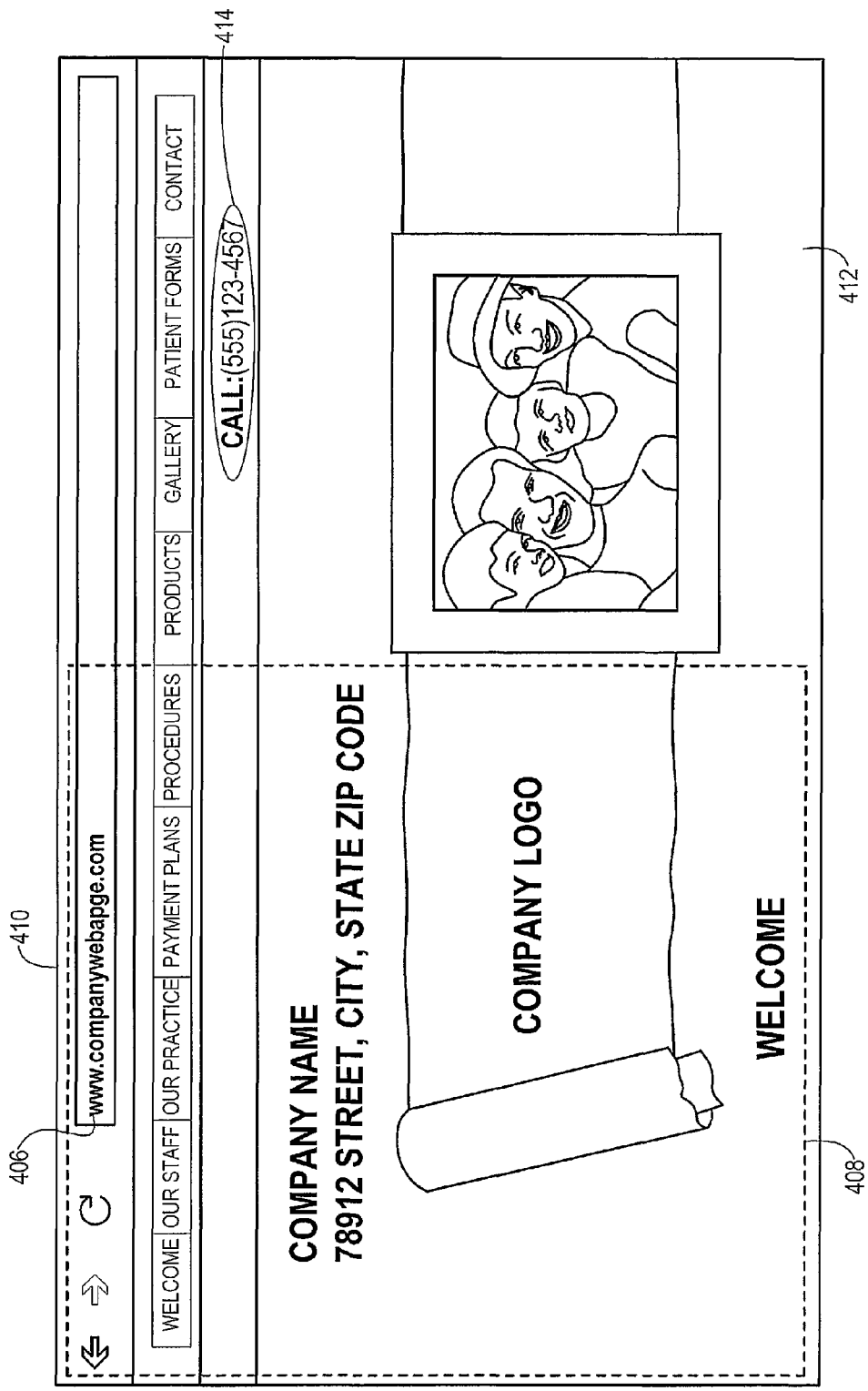
FIG. 4B illustrates past activities by a user of the computing device 400.

The image content 408 displayed on the display screen 402 does not include an image of the phone number of the business (see reference numeral 414) as it is displayed in the larger screen view 410 of the web page 412 shown in FIG. 4B. Thus, in the example implantation of FIG. 4A, it is intended that the user of the computing device 400 will recognize the caller based on the partial view 408 of the web page 412. Data for identifying the caller is therefore presented to the user in a form that is contextually relevant to a way in which the user encountered the caller in the past, i.e. by viewing the web page 412. The computing device 400 may locate the phone number 404 from within web browsing history data, which may include html code, downloaded image files, or metadata associated with the web page 412, stored in a local memory of the computing device 400 or in remote storage. The image content 408 is output by the computing device 400, for display on the display screen 402 as shown in FIG. 4A, once the phone number 404 is located from the history data. The web browsing activity may have been performed on the computing device 400, for example using a web browser application executing on the computing device 400.

Figure 5A:
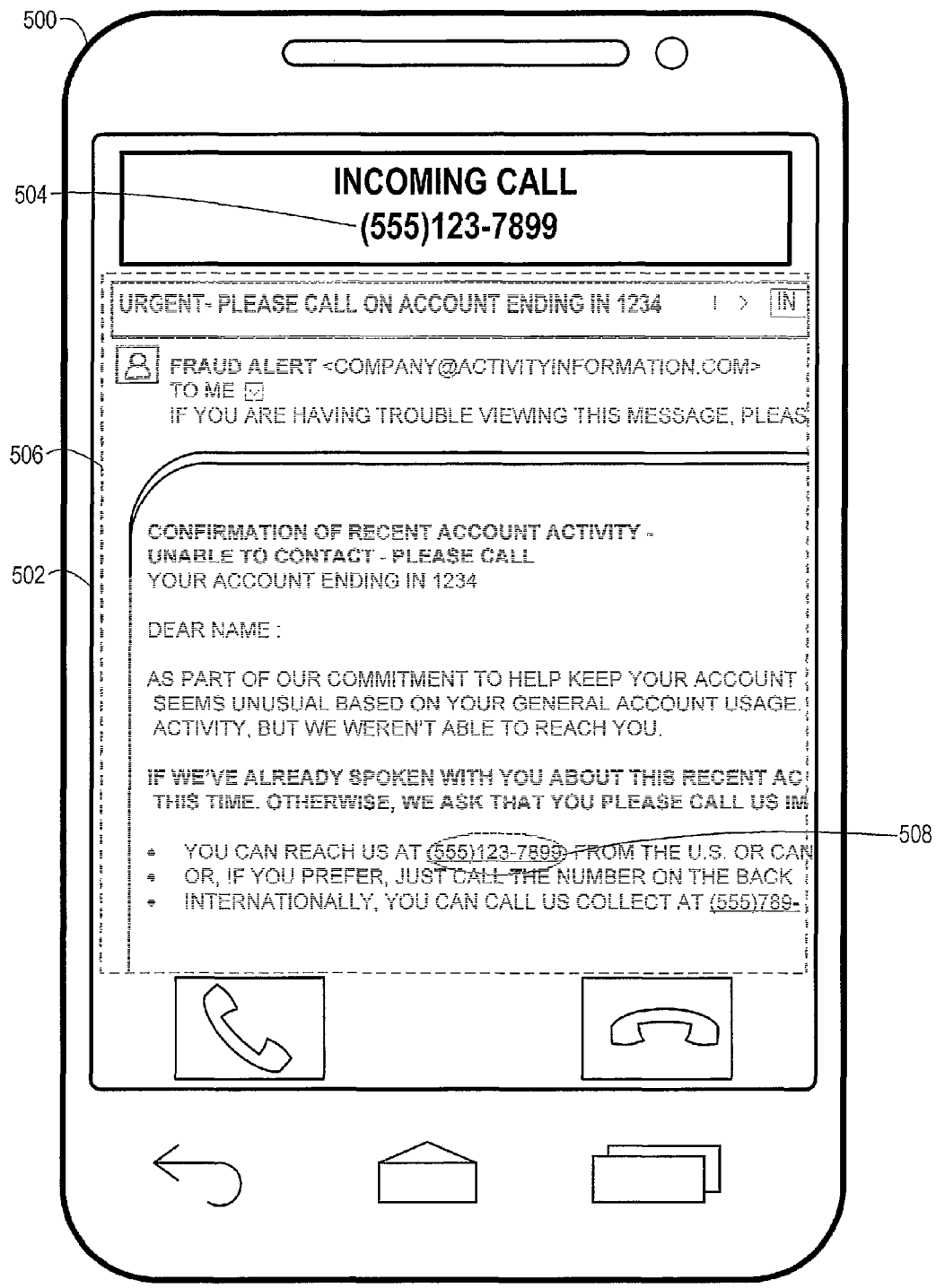
FIG. 5A illustrates a computing device 500 according to an example implementation.
Figure 5B:
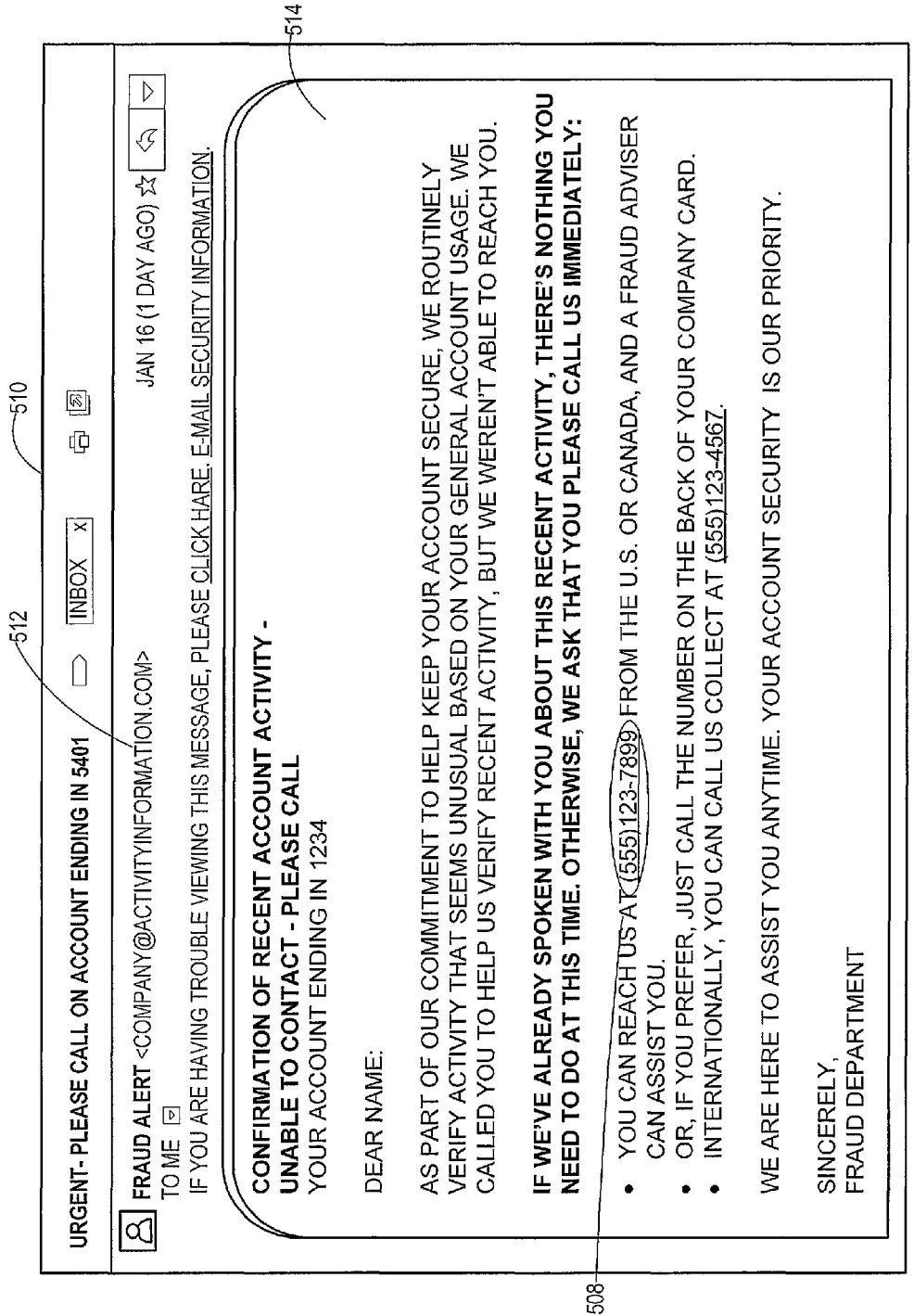
FIG. 5B illustrates past activities by a user of the computing device 500.

FIG. 5A illustrates a mobile computing device 500 according to an example implementation of the disclosed technology, which may include some or all of the components of the computing device 100 shown in FIG. 1. The computing device 500 is configured to output, for display on a display screen 502, a phone number 504 of an incoming call and image content 506 illustrating a partial view of an email message 514 that was exchanged between the user of the computing device 500 and a caller associated with the phone number 504 of the incoming call. The image content 506 displayed on the display screen 502 corresponds to a portion of the larger screen view 510 of the email message 514 as illustrated in FIG. 5B, and as it was displayed on a device used to view the email message 514 in the past, which may be the computing device 500. The computing device 500 has located the phone number 504 in history data associated with electronic messages exchanged between the user and the caller in the past.

The image content 506 includes, as shown in the partial view of FIG. 5A, an email address 512 of the sender of the email message 514, associated with the phone number 504, as it is shown in the body of the email message 514 (see reference numeral 508). In the example implementation of FIG. 5A, it is intended that a user of the computing device 500 will recognize the caller based on the partial view of the email message 514, which contains the address of the sender 512 and a portion of the body of the email message 512 that contains the phone number 504. Data for identifying the caller is therefore presented to the user in a form that is contextually relevant to a way in which the user encountered the caller associated with the phone number 504, i.e. through exchanging an email message. As displayed on the display screen 502, the phone number 504 is visually emphasized relative to other portions of the image content 506, using a circular outline 508 to enhance its visibility.

Figure 6:
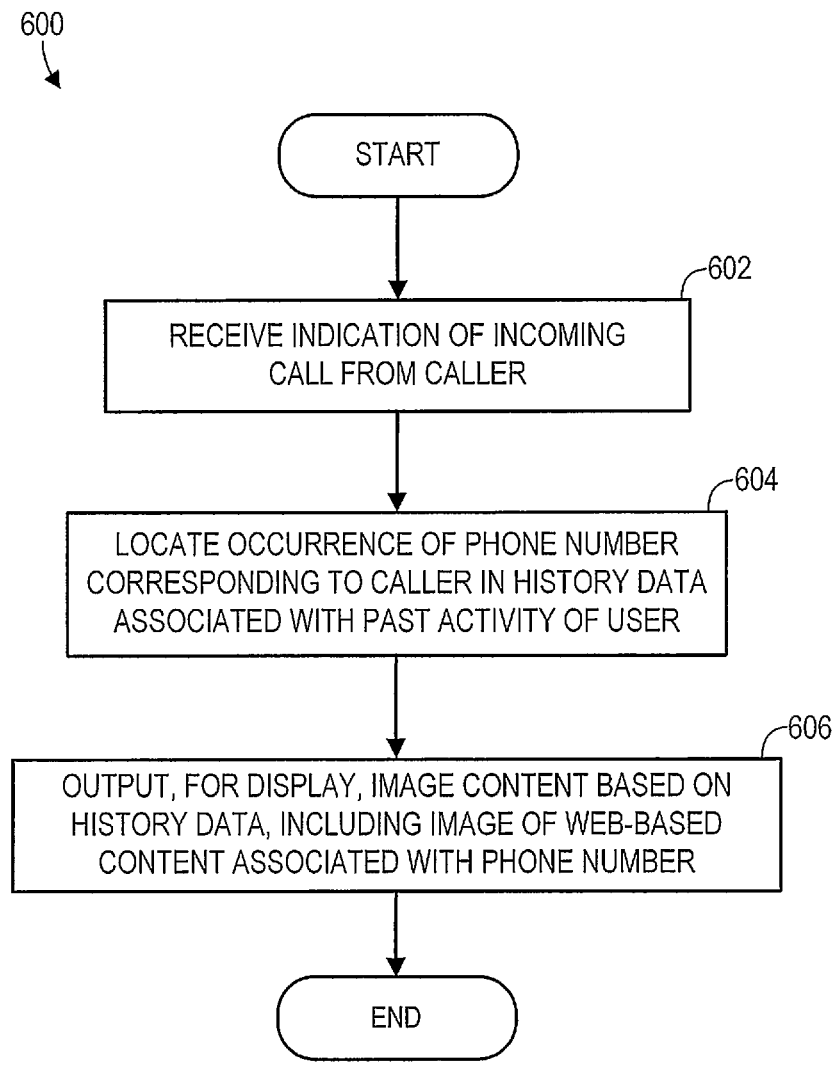
FIG. 6 is a flow diagram of a method 600 according to an example implementation.

FIG. 6 is a flow diagram of a method 600 according to an example implementation of the disclosed technology. The method 600 begins at block 602, where a computing device receives an indication of an incoming call from a caller with a corresponding phone number. At block 604, the computing device locates one or more occurrences of the phone number in history data associated with past activity of the user of the computing device in relation to the caller. At block 606, the computing device outputs, for display, image content based on the history data. The image content includes an image of web-based content associated with the phone number. The method 600 ends following block 606.

In an example implementation, the image of the web-based content associated with the phone number includes an image corresponding to a web page associated with the caller. The past activity of the user may include interacting with the web page. In an example implementation, the image of the web-based content associated with the phone number includes an image corresponding to results of a search performed in the past, by the user of the computing device, for information associated with the caller. In an example implementation, the image of the web-based content associated with the phone number includes an image corresponding to a message exchanged between the user and the caller.

In example implementation, the web-based content associated with the phone number includes an image corresponding to a physical location associated with the caller. The image corresponding to the physical location may include a map representation of the physical location. The history data may include geolocation data. The past activity of the user may include physically visiting the location associated with the phone number.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
   responsive to receiving, at a computing device, an indication of an incoming request for live communication from a caller having corresponding identifying information:
   locating, by the computing device, at least one occurrence of the identifying information in history data associated with a past web-based query of a user of the computing device in relation to the caller, and
   outputting, by the computing device, for display, image content based on the history data, the image content including web-based content corresponding to results responsive to the web-based query.

2. The method of claim 1, wherein the web-based content includes an image corresponding to a web page associated with the caller.

3. The method of claim 2, wherein the history data associated with the past web-based query includes user interaction with the web page.

4. The method of claim 1, wherein the image content includes an image corresponding to a message communicated between the user and the caller.

5. The method of claim 1, wherein the web-based content includes an image corresponding to a physical location associated with the caller.

6. The method of claim 5, wherein the image corresponding to the physical location associated with the caller includes a map representation of the physical location.

7. The method of claim 1, wherein the image content, as output for display, contains the identifying information.

8. The method of claim 1, wherein the identifying information includes a phone number associated with the caller.

9. A system, comprising:
   one or more processors;
   a memory coupled to the one or more processors and storing instructions that, when executed by the one or more processors, cause the system to:
   responsive to receiving an indication of an incoming request for live communication from a caller having corresponding identifying information,
   locate at least one occurrence of the identifying information in history data associated with a past web-based query of a user of the computing device in relation to the caller, and
   output, for display, image content based on the history data, the image content including web-based content corresponding to the results responsive the web-based query.

10. The system of claim 9, wherein the web-based content includes an image corresponding to a web page associated with the caller.

11. The system of claim 10, wherein the history data associated with the past web-based query includes user interaction with the web page.

12. The system of claim 9, wherein the image content includes an image corresponding to a message communicated between the user and the caller.

13. The system of claim 9, wherein the web-based content includes an image corresponding to a physical location associated with the caller.

14. The system of claim 13, wherein the image corresponding to the physical location associated with the unidentified caller includes a map representation of the physical location.

15. The system of claim 9, wherein the image content, as output for display, contains the identifying information.

16. The system of claim 9, wherein the identifying information includes a phone number associated with the caller.

17. A non-transitory computer-readable medium storing instructions that, when executed by one or more processors, cause a computing device to:
   responsive to receiving an indication of an incoming call from caller having corresponding identifying information,
   locate at least one occurrence of the identifying information in history data associated with a past web-based query of a user of the computing device in relation to the caller, and
   output, for display, image content based on the history data, the image content including web-based content corresponding to results responsive to the web-based query.

18. The computer-readable medium of claim 17, wherein the web-based content includes an image corresponding to a web page associated with the caller.

19. The computer-readable medium of claim 18, wherein the history data associated with the past web-based query includes user interaction with the web page.

20. The computer-readable medium of claim 17, wherein the image content includes an image corresponding to a message communicated between the user and the caller.

21. The computer-readable medium of claim 17, wherein the web-based content includes an image corresponding to a physical location associated with the caller.

22. The computer-readable medium of claim 21, wherein the image corresponding to the physical location associated with the caller includes a map representation of the physical location.

23. The computer-readable medium of claim 17, wherein the image content, as output for display, contains the identifying information.

24. The computer-readable medium of claim 17, wherein the identifying information includes a phone number associated with the caller.

\* \* \* \* \*